(12) United States Patent
Neier et al.

(10) Patent No.: US 8,177,419 B2
(45) Date of Patent: *May 15, 2012

(54) ANIMAL FEED AND INDUSTRIAL MIXER HAVING STAGGERED ROTOR PADDLES

(75) Inventors: Benjamin R. Neier, Dodge City, KS (US); Rodney R. Neier, Dodge City, KS (US); Gregory R. Reimer, Dodge City, KS (US)

(73) Assignee: Roto-Mix, LLC, Dodge City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,999

(22) Filed: Jul. 1, 2009

(65) Prior Publication Data

US 2009/0268549 A1 Oct. 29, 2009

Related U.S. Application Data

(63) Continuation of application No. 11/426,408, filed on Jun. 26, 2006, now Pat. No. 7,566,166.

(51) Int. Cl.
 *B01F 7/04* (2006.01)
 *B01F 7/08* (2006.01)
(52) U.S. Cl. .................. 366/299; 366/313; 366/603
(58) Field of Classification Search ............... 241/101.5, 241/101.6, 101.8, 227, 252, 605; 366/313, 366/603, 297–300

See application file for complete search history.

(56) References Cited

U.S. PATENT DOCUMENTS

| 64,149 | A | | 4/1867 | Roberts | |
|---|---|---|---|---|---|
| 394,431 | A | | 12/1888 | Barret | |
| 531,601 | A | * | 12/1894 | Schultz | 241/301 |
| 603,537 | A | | 5/1898 | Pearson | |
| 1,134,220 | A | | 4/1915 | Nash | |
| 1,392,054 | A | * | 9/1921 | Herron | 241/167 |
| 1,717,760 | A | | 6/1929 | Charnley | |
| 2,575,639 | A | * | 11/1951 | Scranton et al. | 222/142 |
| 3,386,705 | A | * | 6/1968 | Griffin | 366/200 |
| 3,421,740 | A | * | 1/1969 | Behrens | 366/186 |
| 3,638,920 | A | * | 2/1972 | Davis | 366/298 |
| 3,672,640 | A | * | 6/1972 | Crose | 366/300 |
| 3,790,138 | A | * | 2/1974 | Neier | 366/186 |
| 3,804,377 | A | * | 4/1974 | Kugle et al. | 241/98 |
| 3,878,995 | A | | 4/1975 | Nash | |

(Continued)

FOREIGN PATENT DOCUMENTS

EP 490688 A1 6/1992

(Continued)

OTHER PUBLICATIONS

English Abstract—JP 2000-246299—Gou Tekkosho:KK, 1 page.

(Continued)

*Primary Examiner* — Charles E Cooley
(74) *Attorney, Agent, or Firm* — McKee, Voorhees & Sease, P.L.C.

(57) ABSTRACT

An animal feed mixer includes a housing forming first and second chambers. An upper auger and a lower auger are mounted in one of the chambers and a rotor is mounted in the other of the chambers. The rotor includes a plurality of arm assemblies that are staggered with respect to one another, that overlap one another in length, and that have paddles affixed to the outer ends of radially extending arms.

8 Claims, 8 Drawing Sheets

U.S. PATENT DOCUMENTS

| | | | | |
|---|---|---|---|---|
| 3,948,451 A | * | 4/1976 | Pecis | 241/154 |
| 3,995,836 A | * | 12/1976 | Carter et al. | 366/192 |
| 4,082,198 A | * | 4/1978 | Anderson et al. | 414/502 |
| 4,298,289 A | * | 11/1981 | Walley | 366/196 |
| 4,330,091 A | * | 5/1982 | Rozeboom et al. | 241/73 |
| 4,506,990 A | * | 3/1985 | Neier et al. | 366/299 |
| 4,597,672 A | * | 7/1986 | Neier et al. | 366/186 |
| 4,660,987 A | | 4/1987 | Robinson | |
| 4,741,625 A | * | 5/1988 | Neier | 366/196 |
| 4,756,626 A | * | 7/1988 | Neier | 366/279 |
| 4,799,800 A | * | 1/1989 | Schuler | 366/296 |
| 4,896,970 A | | 1/1990 | Schuler | |
| 5,143,310 A | * | 9/1992 | Neier | 241/101.8 |
| 5,249,751 A | * | 10/1993 | Schuler | 241/222 |
| 5,435,494 A | * | 7/1995 | Knight et al. | 239/675 |
| 5,460,506 A | * | 10/1995 | Price et al. | 425/190 |
| 5,622,323 A | * | 4/1997 | Krueger et al. | 241/101.76 |
| 5,645,345 A | * | 7/1997 | O'Neill et al. | 366/186 |
| 5,782,559 A | * | 7/1998 | Neier et al. | 366/279 |
| 5,835,827 A | * | 11/1998 | Kishimoto | 399/254 |
| 5,913,602 A | | 6/1999 | Steele | |
| 5,967,433 A | * | 10/1999 | O'Neill et al. | 241/101.2 |
| 6,007,008 A | * | 12/1999 | Neier | 241/101.8 |
| 6,203,185 B1 | * | 3/2001 | Neier | 366/156.2 |
| 6,752,530 B2 | * | 6/2004 | Pecis | 366/295 |
| 6,827,304 B2 | * | 12/2004 | Rousseau | 241/73 |
| 6,923,393 B1 | * | 8/2005 | Neier et al. | 241/30 |
| 7,028,932 B2 | * | 4/2006 | Lucas et al. | 241/101.8 |
| 7,566,166 B2 | * | 7/2009 | Neier et al. | 366/299 |

FOREIGN PATENT DOCUMENTS

| | | | |
|---|---|---|---|
| GB | 2049455 A | * | 12/1980 |
| GB | 2099776 A | * | 12/1982 |
| JP | 2000-246299 | | 9/2000 |
| JP | 2001-054781 | | 2/2001 |

OTHER PUBLICATIONS

English Abstract—JP 2001-054781—Iseki & Co Ltd, 1 page.

* cited by examiner

ANIMAL FEED AND INDUSTRIAL MIXER HAVING STAGGERED ROTOR PADDLES

CROSS-REFERENCE TO RELATED APPLICATIONS

This is a Continuation Application of U.S. application Ser. No. 11/426,408 filed Jun. 26, 2006, now U.S. Pat. No. 7,566,166 issued on Jul. 28, 2009, which is hereby incorporated by reference in its entirety.

BACKGROUND OF THE INVENTION

This invention relates to an animal feed and industrial mixer having staggered rotor paddles and method for making and using same.

U.S. Pat. No. 4,597,672 shows a feed mixer having a rotor in FIG. 9 which includes paddles 146 that are movably mounted to the ends of arms 128. This movable mounting adds to the cost of production and is less desirable for mixing. The rotor shown in FIG. 9 of the '672 patent also shows bars 132 which extend between the arm assemblies 128, 130 and hinder proper mixing. In addition, the paddles 146 extend between the arm assemblies 128, 130. It has been found that these arms 132 and paddles 146 hinder the mixing action that is obtained with the rotor shown in FIG. 9.

U.S. Pat. Nos. 6,007,008 and 4,756,626 show similar mixers wherein the arms extending outwardly from the rotor shaft of the larger rotor 24 are tangentially mounted with respect to the outer cylindrical surface of the rotor shaft. This patent also shows bars 30 which extend between the various arm assemblies and hinder the mixing action created during the rotation of rotor 24.

U.S. Pat. No. 3,638,920 shows an agitator 10. There are several deficiencies of agitator 10. It is utilized with augers 24, 26, that are positioned on opposite sides of agitator 10, rather than having an upper auger and a lower auger positioned on one side of the agitator. Considerably less thorough mixing occurs with this structure and the mixing time is also more. The '920 patent also shows paddles 18 that are canted with respect to the axis of shaft 11 so as to impart an axial movement to the material being mixed. Furthermore the shafts or arms 20 have blades extending radially outwardly therefrom that also impart an axial movement to the material being mixed.

In contrast, the present invention has arms that are free from blades or other members. It also has paddles that are parallel to the axis of the rotor shaft. Consequently the paddles of the present invention lift and tumble the ingredients being mixed and do not impart an axial motion to the ingredients being mixed. Furthermore the present invention has an upper and lower auger on one side of the rotor that impart axial movement in opposite directions to the materials being mixed. It also has no bars connecting the outer ends of the arms. The result is improved mixing action, more thorough mixing, and reduced mixing time over the above prior art references.

Therefore, a primary object of the present invention is the provision of an animal feed and industrial mixer having improved staggered rotor paddles thereon and a method for making and using same.

A further object of the present invention is the provision of a plurality of arm assemblies having paddles on the outer ends thereof which are circumferentially staggered with respect to the various arm assemblies mounted on the rotor shaft.

A further object of the present invention is the provision of a plurality of arm assemblies attached to a shaft and extending radially outwardly therefrom wherein the paddles are affixed to and held against movement with respect to the outer ends of the arms of each assembly.

A further object of the present invention is the provision of an animal feed mixer wherein the paddles each have flexible members attached thereto, with flexible edges extending in a radial direction beyond the paddles.

A further object of the present invention is the provision of a plurality of paddles each having a paddle edge extending a predetermined length parallel to the shaft of the rotor.

A further object of the present invention is the provision of a mixer that is extremely effective in mixing animal feed mixtures containing ethanol by products such as wet distiller's grain.

A further object of the present invention is the provision of a plurality of arm assemblies having paddles with predetermined length of edges, each of the paddles overlapping the adjacent paddles on the arm assemblies for effective clean out.

A further object of the present invention is the provision of a plurality of arm assemblies having paddles affixed to the outer ends thereof and being free from bars or members connecting between the various arm assemblies.

A further object of the present invention is the provision of a rotor having a plurality of arm assemblies mounted on the ends thereof and having a plurality of paddles affixed to the outer ends of the arms, the paddles turning rotation of the rotor imparting only lifting and tumbling action and not imparting any axial or end to end movement with respect to the rotation of the rotor.

A further object of the present invention is the shortening of mixing time to sometimes as much as ½ of the time needed for prior mixers.

A further object of the present invention is upper and lower augers that impart axial movement of the mixture in opposite directions.

A further object of the present invention is the provision of an animal feed and industrial mixer which is improved in appearance, has an improved mixing action, and which is durable during its operation.

BRIEF SUMMARY OF THE INVENTION

The foregoing objects are obtained by an animal feed and industrial mixer for mixing an animal feed mixture and other industrial mixtures. For example, the mixer can be used for such industrial applications as compost mixtures, explosive mixtures, or other industrial mixtures. The mixer includes a housing having first and second opposite end walls and first and second opposite side walls formed therein and defining a first chamber and a second chamber in side by side relation to one another. The first and second chambers are also partially in communication with one another. An upper auger is within the first chamber and includes an upper auger shaft mounted for rotation between the first and second end walls of the housing. The upper auger shaft includes one or more upper radial members extending from the upper auger shaft. A lower auger is within the first chamber below the upper auger and includes a lower auger shaft mounted for rotation between the first and second end walls of the housing. The lower auger shaft has one or more lower radial members extending from the lower auger shaft. A rotor is within the second chamber beside the upper and lower augers and includes an elongated rotor shaft mounted for rotation between the first and second end walls of the housing. A plurality of arm assemblies are mounted in spaced relation to one another along the length of the rotor shaft. Each of the arm assemblies comprise two or more arms each having a first end attached to the rotor shaft and having a second end located in an outerward radial direction from the rotor shaft. A plurality of paddles is each mounted on the second ends of the arms of the arm assemblies. Each of the paddles on one of the arm assemblies is circumferentially staggered with respect to each of the paddles on adjacent ones of the arm assemblies. Each of the paddles is free from surfaces that impart axial movement to the feed mixer during rotation of the rotor shaft but is positioned to contribute to an improved tumbling action. The arm assemblies and the plurality of paddles extending outward in a radial direction from the rotor shaft, extend a greater distance radially than either of the upper and lower radial members which extend in a radial direction from the upper and lower auger shafts. Mechanism is attached to and rotates each of the upper auger, lower auger, and rotor.

According to another feature of the present invention, the first ends of the arms of each arm assembly are attached only to the additional rotor shaft, and the remaining portions of the arms and paddles within each arm assembly are free from connection to the other arm assemblies.

According to another feature of the present invention, the paddles each have a paddle edge extending in a line parallel to the longitudinal axis of the rotor shaft. The line has a length of predetermined distance. The predetermined lengths of the paddles within adjacent ones of the arm assemblies overlap with one another.

According to another feature of the present invention, the plurality of paddles each include opposite elongated surfaces that have longitudinal surface axes extending in a direction parallel to the rotor shaft so that rotation of the rotor shaft and paddles on the arm ends does not cause the feed mixer to move in an axial direction, but does impart a lifting and tumbling action to the mixer.

The method of the present invention comprises taking a mixer housing having a first end wall, a second end wall, a first side wall, a second side wall, and a bottom wall defining a first chamber and a second chamber therein. The first and second chambers are in at least partial communication with one another. The feed materials are placed within the first and second chambers. An upper auger is rotated in the first chamber. The upper auger has at least one radial member which causes movement of the feed materials in a first axial direction during rotation of the upper auger. A lower auger is in the first chamber below the upper auger and is rotated. The lower auger includes at least one radial member which causes axial movement of the feed materials in a second axial direction opposite from the first axial direction during rotation of the lower auger. A rotor is rotated and includes a rotor shaft and a rotor axis in the second chamber beside the upper and lower augers. A plurality of arms is affixed at their first ends to a rotor shaft. A paddle is affixed to the second ends of each of the plurality of arms so that the paddle is held against movement with respect to the arm. The materials are then lifted and tumbled with the paddles during rotation of the rotor. The paddles are oriented in a direction parallel with the axis of the rotor shaft within the second chamber to prevent axial movement of the feed materials within the second chamber, while allowing lifting and tumbling action of the mixture between the first and second chambers.

According to another feature of the present invention, a plurality of arms are attached to the rotor shaft at a plurality of positions located in spaced relation to one another along the length of the rotor shaft. The method further comprises staggering circumferentially the paddles on the second ends of one of the arms with respect to the paddles on the second ends adjacent arms located in spaced relation along the length of the rotor shaft.

According to another feature of the present invention, the paddles each include a paddle edge extending in a direction parallel to the rotor axis. The paddle edge extends a predetermined distance. The method comprises overlapping the predetermined distances of each of the paddles within one of the arm assemblies with the predetermined distances of each of the paddles within adjacent ones of the arm assemblies.

DETAILED DESCRIPTION OF THE PREFERRED EMBODIMENT

The following is a description of the preferred embodiment. However, the scope of the claims extends beyond the description of the preferred embodiment, and the following description of the preferred embodiment is intended only to be exemplary of the structure of the present invention.

Figure 1:
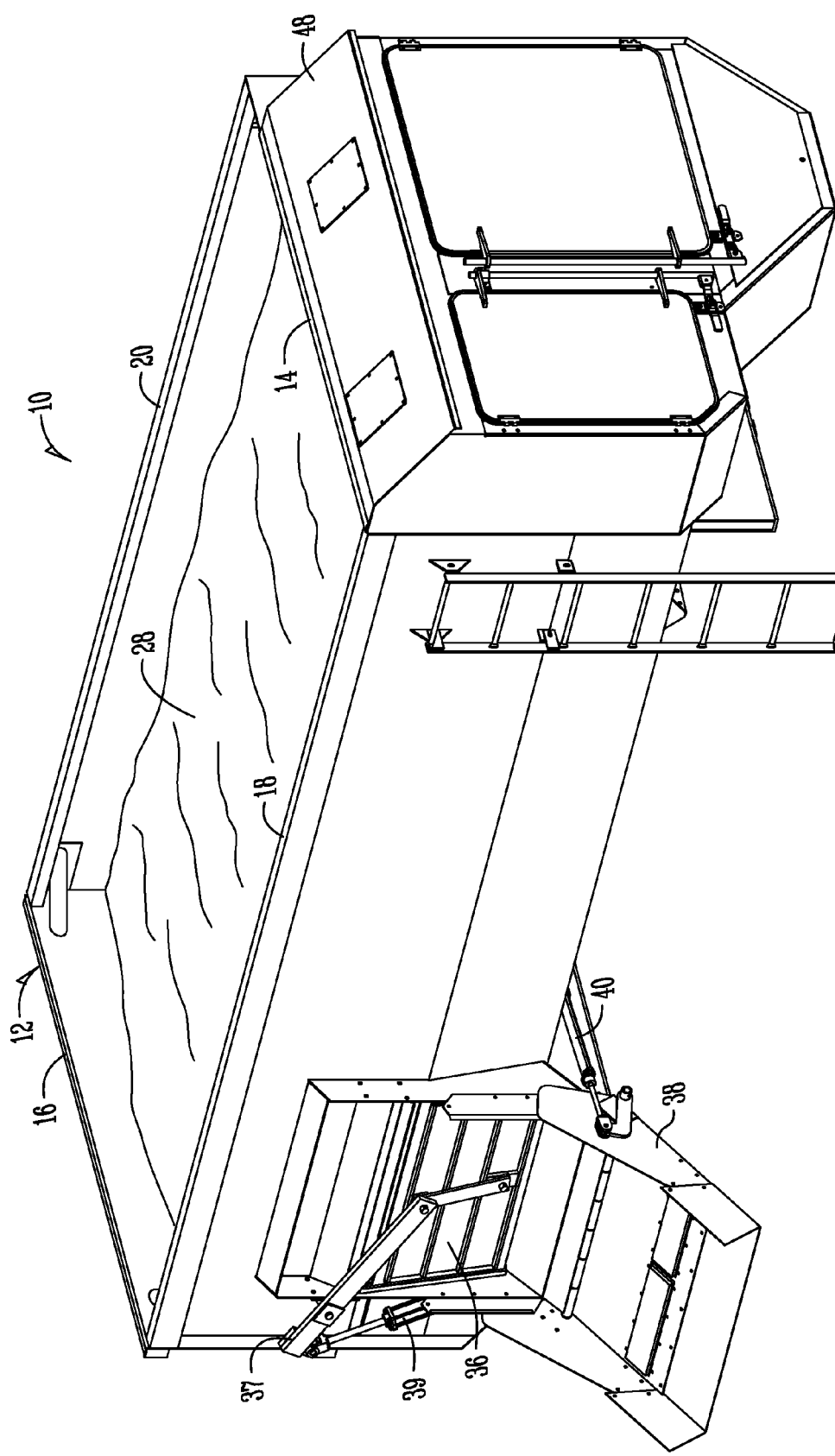
FIG. 1 is a perspective view of the feed mixer of the present invention.
Figure 4:
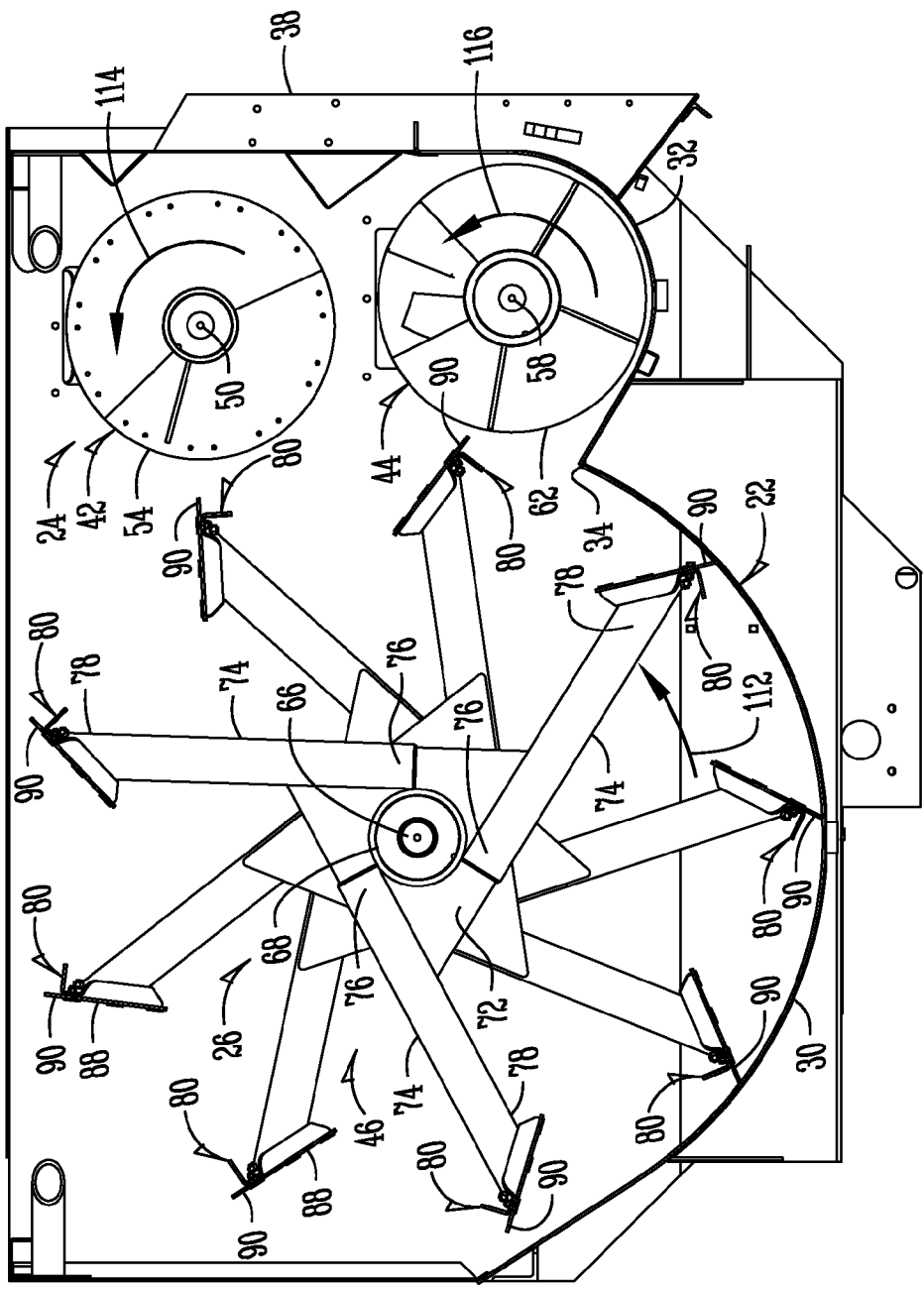
FIG. 4 is a sectional view taken through the feed mixer and showing the arrangement of the upper auger, the lower auger, and the rotor.

Referring to FIG. 1 of the drawings an animal feed mixer 10 is comprised of a housing 12 comprising a front wall 16, a rear wall 14, a first side wall 18, a second side wall 20, and a bottom wall 22 (FIG. 4). These walls define a first chamber 24 and a second chamber 26, and a feed mixture 28 (FIG. 1) is inserted into the first and second chambers 24 and 26. The bottom wall 22 includes a large curved portion 30 and a small curved portion 32 which join together to form an apex 34. The apex 34 defines a division between the first chamber 24 and the second chamber 26.

Figure 2:
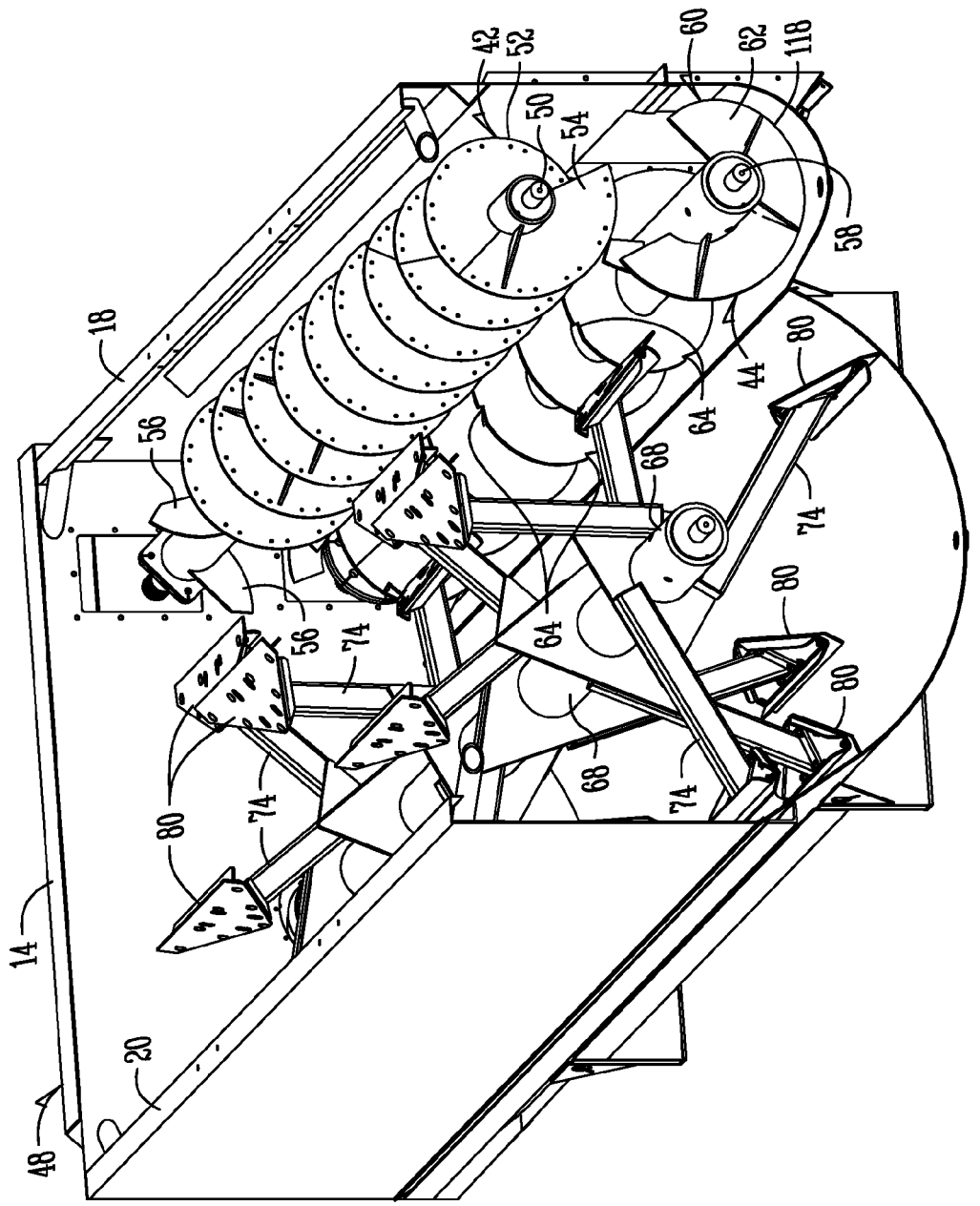
FIG. 2 is a perspective view of the feed mixer having the forward wall removed therefrom.
Figure 3:
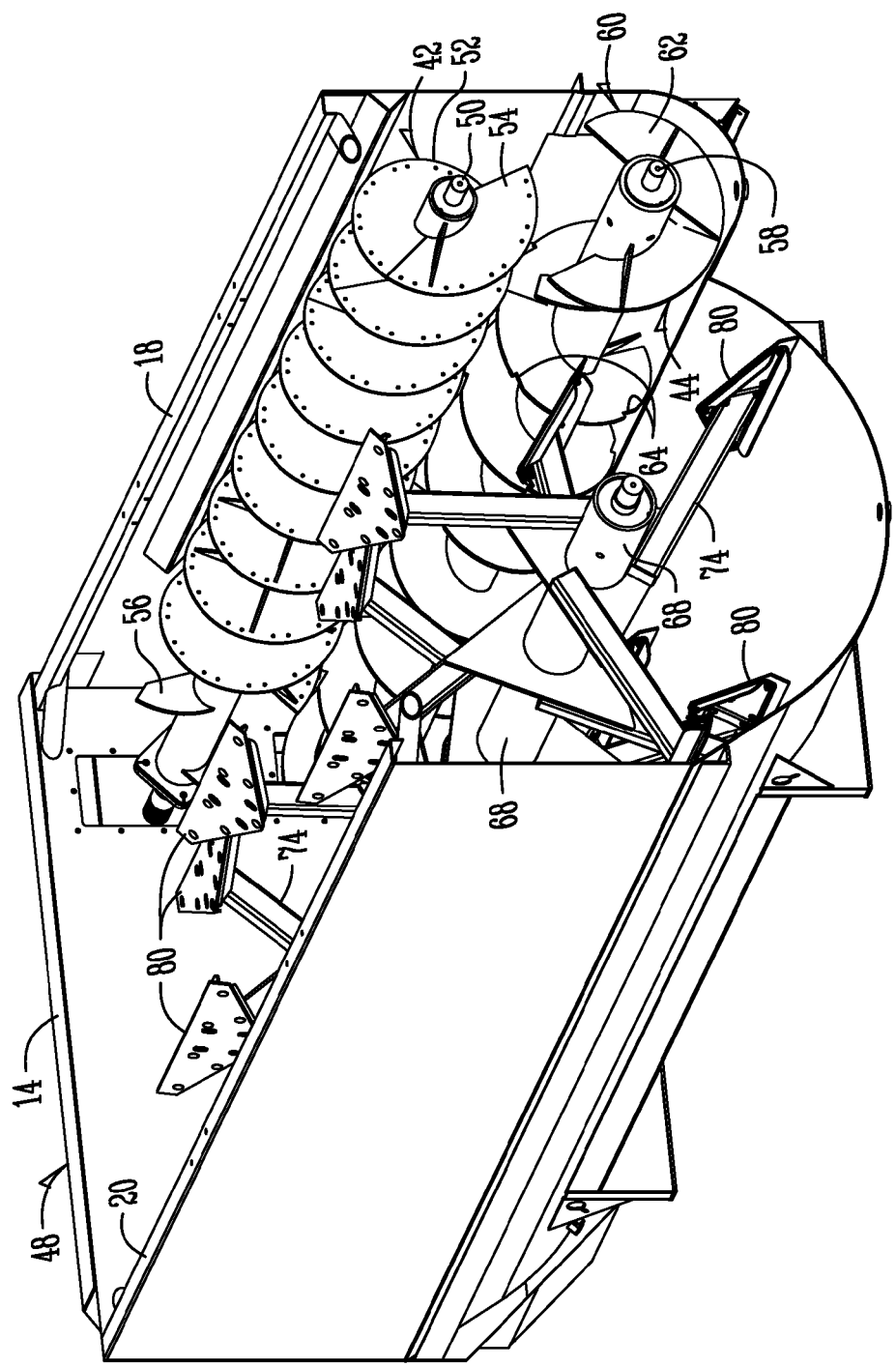
FIG. 3 is a perspective view similar to FIG. 2, but showing the feed mixer from a slightly different angle.

Referring again to FIG. 1, a gate 36 includes a spout 38 which is pivotally mounted under the gate 36. Gate 36 is mounted for vertical sliding movement over a gate opening in housing 12. A linkage 37 is connected to the gate 36 and is also pivotally connected to the side wall 18. It is operated by a hydraulic cylinder 39. The feed mixer 10 shown in FIG. 1 can be a trailer, it can be a part of a truck designed to carry the feed mixer 10, or it can be stationary. Referring to FIGS. 2-4, within the first chamber 24 are an upper auger 42 and a lower auger 44. A rotor 46 is mounted within the second chamber 26 and is larger in diameter than the two augers 42 and 44. A drive box 48 (FIGS. 1 and 5) encloses the mechanism shown in FIG. 6 for driving the upper auger 42, lower auger 44, and rotor 46. The upper auger 42 includes an upper auger shaft 50 which extends between the front wall 16 and the rear wall 14 and which is mounted for rotation therein. The upper auger 42 includes one or more radial members 52 which may comprise an upper flighting 54 or an upper paddle 56. Other types of rods, paddles, or other flightings may be utilized as well.

However, it is important that the upper auger rotate to drive the material being mixed in a first axial direction.

Lower auger 44 includes a lower auger shaft 58 which is rotatably mounted within and extends between front wall 16 and rear wall 14. Lower radial members 60 may take the form of flightings such as shown at 62 or may also include rods, paddles, or other radially extending devices. The flighting 62 are provided with lower flighting teeth 64 at their outer edges.

Figure 7:
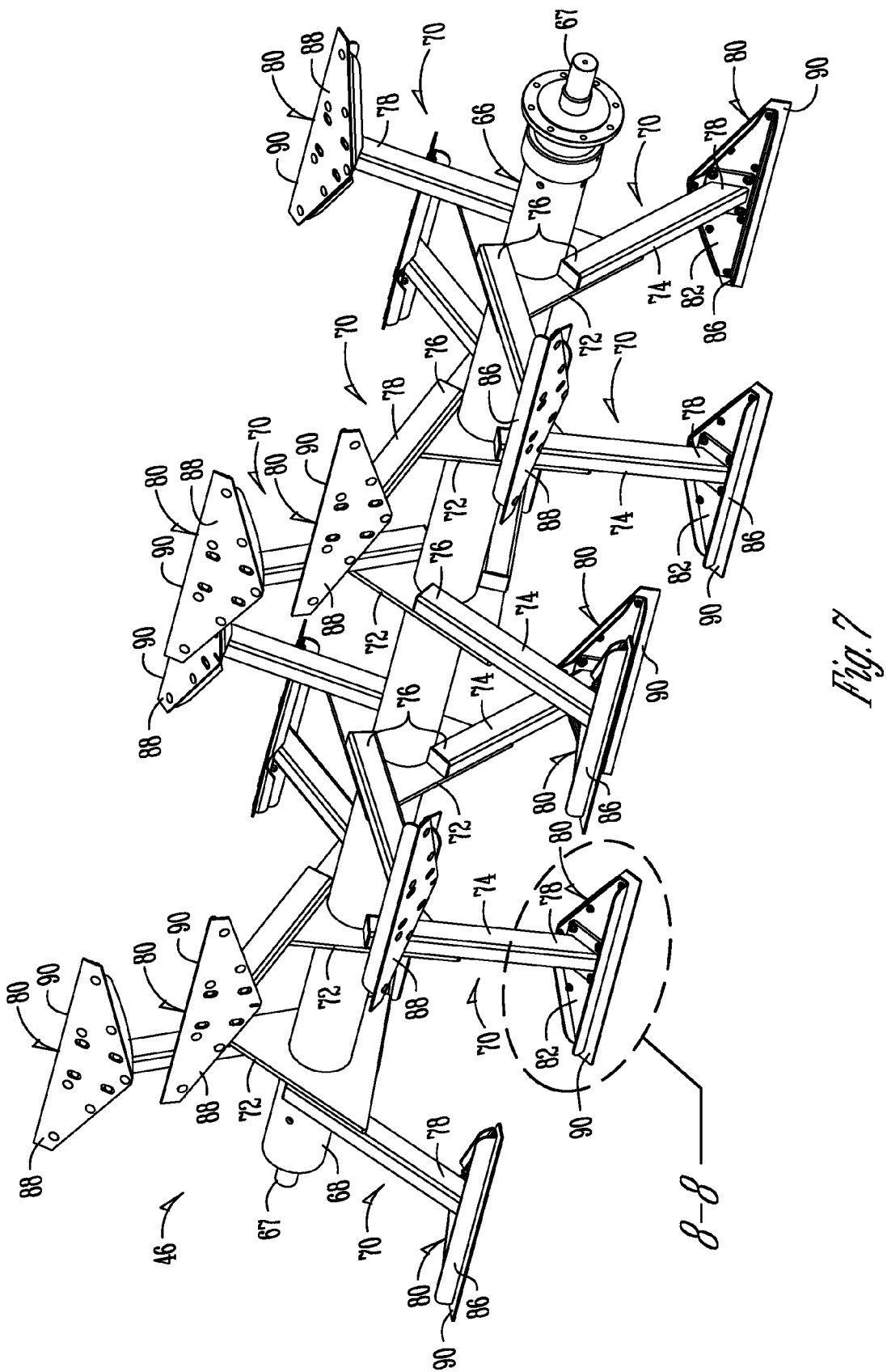
FIG. 7 is a perspective view showing the larger rotor of the present invention.

A rotor shaft 66 is shown in perspective in FIG. 7, and as shown in cross section in FIG. 4. Shaft 66 includes an additional rotor shaft cylindrical surface 68 which comprises an outer cylindrical surface of the shaft 66.

A plurality of arm assemblies 70 (FIGS. 5 and 7) are attached to the additional rotor shaft 66 at spaced intervals along the length of shaft 66. Each of the arm assemblies comprises a plate 72 which is affixed to the shaft 66 by welding or by bolting or other means. As shown in FIG. 7, three arms 74 are attached to the plate 72. However, the number of arms 74 in each arm assembly 70 may be two or more. Each of the arms 74 includes a first end 76, and a second end 78. Preferably the lengths of all of the arms 74 are the same between first ends 76 and second ends 74, but alternatively the lengths may vary from one arm 74 to another arm 74. The longitudinal axes of the arms 74 are each parallel to a tangent to the outer cylindrical surface 68. This can be seen in FIG. 4. Also, the outer edges of each arm coincide with the outer edges of the plate 72. This arrangement of the arms 74 is referred to as cantilevering, and results in improved lifting and tumbling action of the second ends 78 of the arms. Preferably, each of the arms 74 is square or round in cross section but is otherwise free from blades or other devices that impart an axial action to the mixture 28.

Alternatively, arms 74 (FIG. 7) could be made of a spring metal or other material so as to be flexible. An example would be for the arms 74 to be made similar to vehicle leaf springs.

Figure 8:
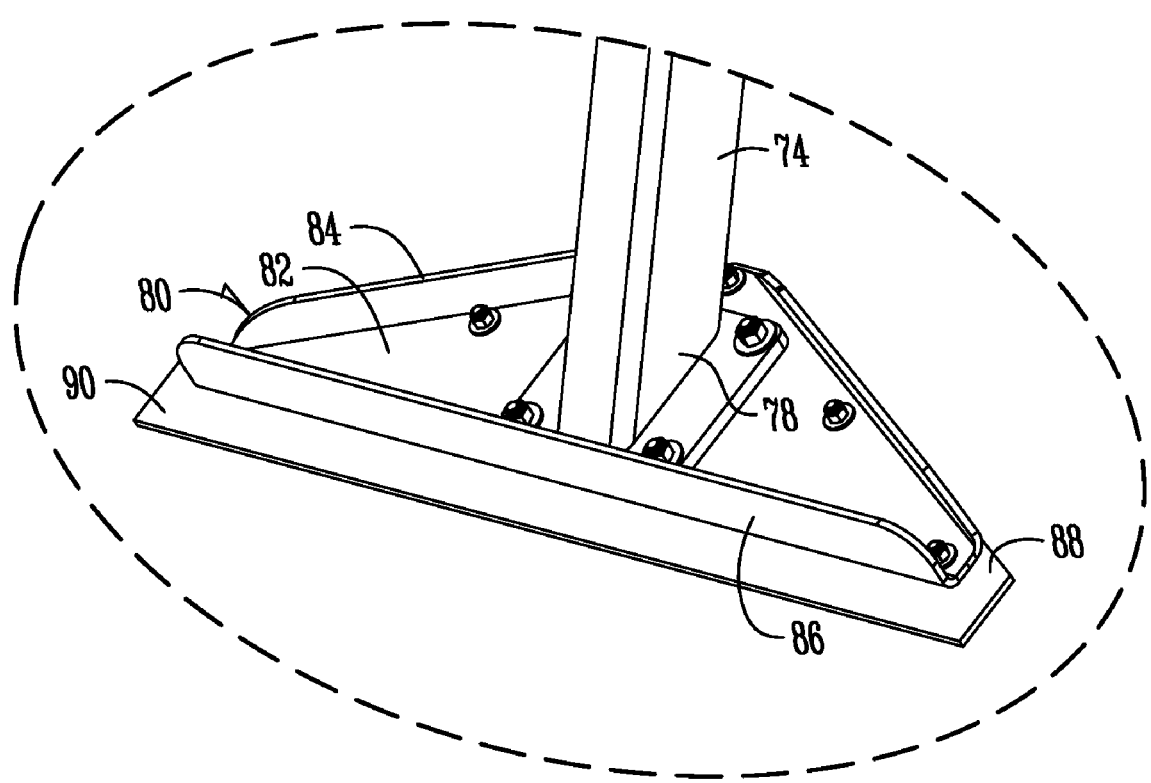
FIG. 8 is a perspective detail view of one of the paddles shown in FIG. 7.

Bolted or otherwise attached to the second ends 78 of each of the arms 74 is a paddle 80. Paddle 80 is shown to be a triangular plate, but the configuration for paddle 80 may be varied without detracting from the invention. Each paddle 80 is comprised of a flat plate 82 (FIG. 8) having one or more reinforcing ribs 84 along one edge, and having a stop rib 86 along its other edge. A flexible member 88 is glued, adhered, or bolted to the outer surface of each paddle 80. As can be seen in FIG. 4, the outer edge of each flexible member 88 includes a flap 90 which extends beyond the plates 82 of paddle 80 and which is adapted to engage and slip along the arcuate curved portion 30 of the bottom wall 22 during rotation of the rotor shaft 66. The ends of the rotor shaft 66 include axles 67 which are journaled in the front and rear walls 16, 14 so that the additional rotor 46 may be rotated.

As can be seen in FIG. 4, each of the paddles 80 are angled with respect to each arm 74 so that flaps 90 trail the arm 74 during rotation of the rotor in the direction indicated by arrow 112. However, preferably the paddles 80 include longitudinal axes that are parallel to shaft 66 so as to impart a lifting and tumbling action, but not an axial direction to the materials being mixed. Alternatively the paddles 80 impart a single axial direction, but not opposite directions to the materials being mixed.

The rotation of augers 42, 44 is shown by arrows 114, 116, respectively. Paddles 80 are rigidly mounted on the second ends 78 of arms 74. This provides simplified construction and also minimizes the moving parts necessary to operate the additional rotor 46. However, paddles 80 may also be movably mounted on the ends 78 of arms 74. The flexible flaps 90 provide for flexion of the ends of the flexible members 88 as shown in FIG. 4 so as to accommodate clean out of the mixed materials and tolerances in the arrangement of the additional rotor 46 and the curved wall 30.

The flexible members 88 are made of a slick substance which minimizes the frictional movement of rotor 46 with respect to the arcuate wall 30 during rotation of the rotor 46 in the midst of animal feed mixture. This is important because it minimizes the force necessary for imparting rotation to additional rotor 46. Many feed mixes include hay and other granular materials which create friction and the use of low friction or slick flexible members 88 minimizes this friction caused by the animal feed mixture. A preferred compound for the flexible members 88 is identified by the manufacturer as ultra high molecular weight polyethylene, manufactured by Poly-Hi Solidur, located at 2710 American Way, Fort Wayne, Ind. 46809.

Figure 6:
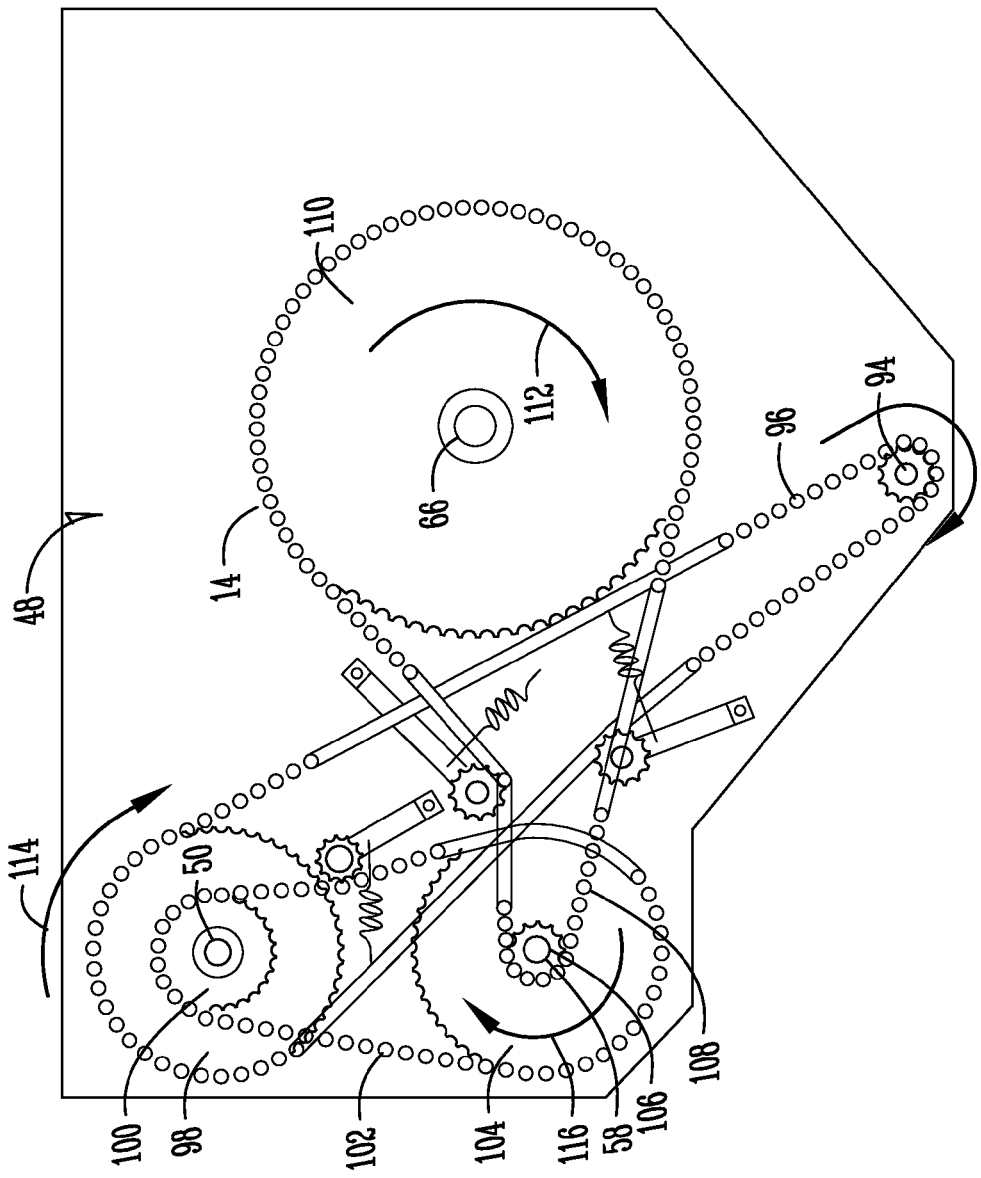
FIG. 6 is a sectional view taken along line 6-6 of FIG. 5.

Referring to FIG. 6, a mechanism comprising a plurality of sprockets is utilized to rotate the auger shafts 50, 58, and the rotor shaft 60. A drive sprocket 94 is driven by a power takeoff (not shown). The drive sprocket 94 engages a drive chain 96 which in turn is trained around an upper auger sprocket 98. The upper auger sprocket 98 includes a second upper auger sprocket 100 which rotates in unison therewith. A second drive chain 102 is trained around the second upper auger sprocket 100 and a lower auger sprocket 104. A second lower auger sprocket 106 is adapted for rotation in unison with the lower auger sprocket 104 and a third drive chain 108 is trained around the second lower auger sprocket 106. The third drive chain 108 is trained around a rotor sprocket 110 which is attached to shaft 66. Thus, the driving of drive sprocket 94 causes rotation of the upper sprocket 98, the lower sprocket 104, and the rotor sprocket 110 in the direction indicated by arrows 112, 114, and 116, respectively.

While upper auger 42 is driven in the same rotational direction as lower auger 44, the flightings are reversed thereon and therefore the upper auger flighting 54 drives the feed mixture 28 in a first axial direction. The lower auger 44 includes lower flighting 62 which cause the feed mixture 28 to be driven in a second axial direction opposite from the first axial direction of the upper flighting 54. The rotational directions of the shafts may be varied by the particular chain drives that are utilized to rotate the augers. However, it is important that the upper auger drive the feed mixture 28 in a first axial direction and the lower auger drive the feed mixture in the opposite direction.

In operation, the rotor 46 rotates the feed mixture 28 by lifting it and tumbling it without imparting axial direction to the feed mixture 28, and the upper auger 42 and the lower auger 44 cause the feed mixture 28 to be driven axially in opposite directions. Paddles 80 do not impart axial direction to the feed mixture 28, but only impart a lifting and tumbling action.

The present invention eliminates bars extending between the outer ends of the arms 74 of the various arm assemblies 70. It has been found that the bars extending between these arm assemblies 70 cause the feed mixture to be rotated in unison during rotation of the rotor 46. The present structure includes no attachment whatsoever between the various arm assemblies 70 except at the inner ends 76 which are welded or otherwise attached to the shaft 66. Thus, the paddles impart a lifting and tumbling action, but do not impart an axial action to the feed mixture during rotation of the rotor shaft 66. Also, the rotation in unison with the rotor 46 of the materials being mixed is reduced because the bars extending between arm assemblies 70 are eliminated.

Figure 5:
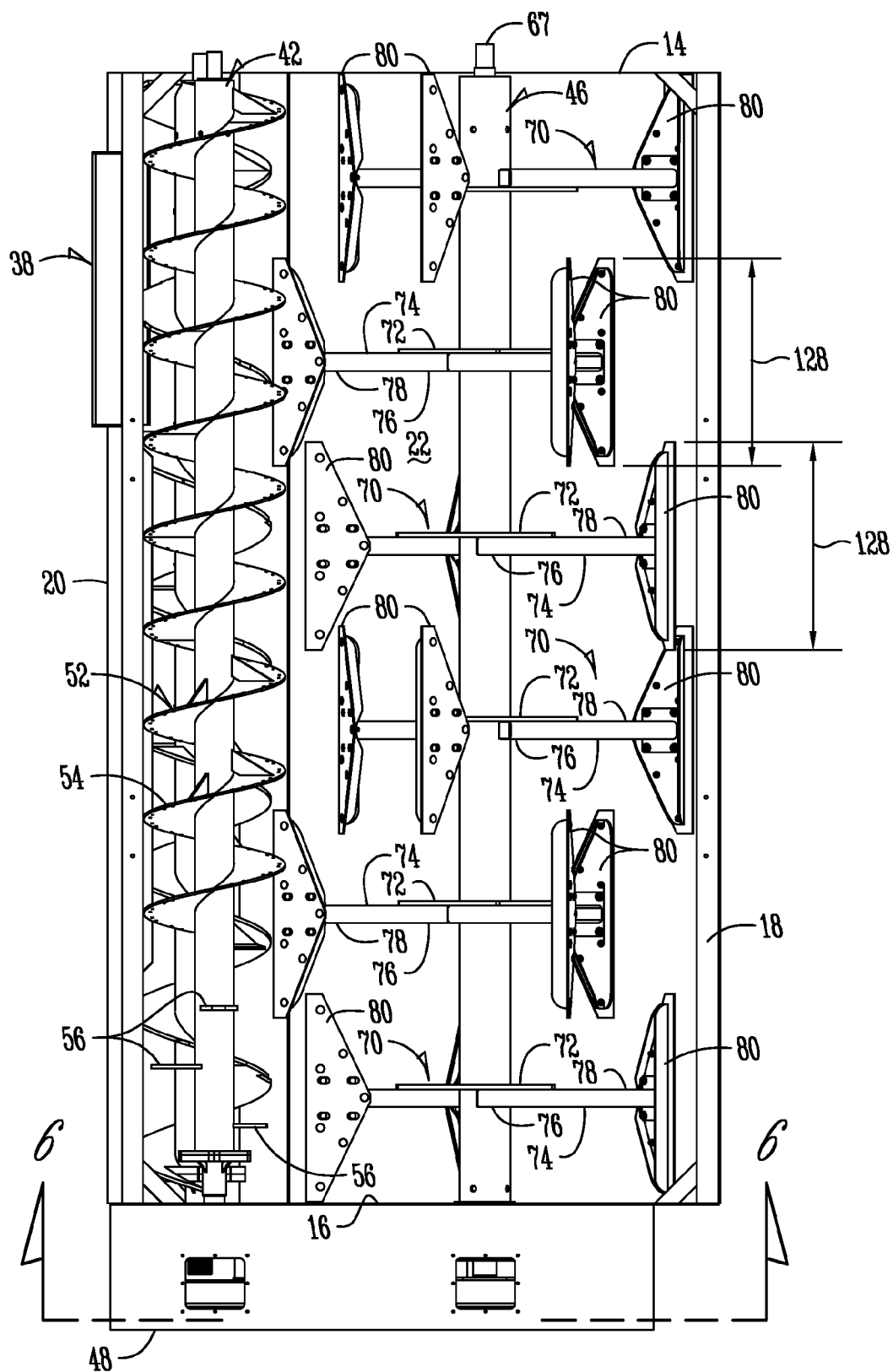
FIG. 5 is a top plan view of the feed mixer of the present invention.

Another feature of the present invention is shown in FIG. 5. The lengths 128 of the outer edges of the paddles 80 overlap one another so that a thorough lifting and cleaning action is obtained during rotation of the additional rotor 46.

The auger rotor as applied to the upper and lower augers may vary depending upon the upper radial members 52 and the lower radial members 60 that are utilized. While flighting such as upper auger flighting 54 and lower auger flighting 62 may be utilized, other means for imparting axial movement to the feed mixture may be utilized. For example, paddles, radial rods, or other devices may be utilized. However, it is important that the upper auger drive the feed mixture in a first axial direction and the lower auger drive the feed mixture in a second axial direction.

Also, it is desirable to utilize a reverse flighting designated by the numeral 118 adjacent the gate 36 so as to cause the opposite ends of the flighting to drive the feed mixture toward the gate 36.

The rotor 46 is substantially larger than combined diameters of the upper auger 42 and the lower auger 44. While the sizes of these rotors may vary, it is preferable that the rotor 46 have a diameter greater than the combined diameters of the upper auger 42 and the lower auger 44.

The present invention greatly improves the mixing time from prior mixers such as shown in U.S. Pat. Nos. 4,597,672; 6,007,008; and 4,756,626, sometimes by as much as ½ the mixing time. It also improves the quality of the mixing.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A mixer for mixing a mixture comprising:
  a housing having first and second opposite end walls, first and second opposite side walls, and a bottom wall forming therein and defining a first chamber and a second chamber in side-by side relation to one another and being partially in communication with one another;
  two augers within the first chamber, each of the augers having at least one radial member attached to an auger shaft, and each of the two augers being mounted for rotation between the first and second opposite end walls, wherein the two augers comprise an upper auger and a lower auger, the upper auger being directly above and aligned with the lower auger within the first chamber;
  a rotor within the second chamber having an elongated rotor shaft mounted for rotation about a rotational rotor axis between the first and second end walls of the housing;
  a plurality of arm assemblies mounted in spaced relation to one another along the length of the rotor shaft, each of the arm assemblies comprising two or more arms, each of the arms having a first end operatively attached to the rotor shaft and having a second end located in an outward radial direction from the rotor shaft;
  all of the second ends of the arm assemblies within each of the arm assemblies being staggered with respect to the adjacent arm assemblies and being free from attachment to each of the adjacent arm assemblies;
  a plurality of paddles, each fixed to the second end of one and only one of the arms of the arm assemblies;
  mechanism attached to, and rotating, each of the upper auger, lower auger, and rotor; and
  wherein each of the paddles is free from surfaces that would impart significant axial movement to a mixture in the second chamber as the rotor shaft is rotated.

2. The mixer of claim 1 wherein each of the paddles has attached thereto a flexible member, the flexible member having a portion thereof extending in a radial direction beyond the paddle for engaging in a flexible manner one of the first and second side walls and the bottom wall of the housing.

3. The mixer of claim 1 wherein the upper auger and the lower auger are beside and in communication with the rotor.

4. The mixer of claim 3 wherein rotation of the upper and lower augers by the mechanism causes the at least one radial member of the upper auger to move the mixture in a first axial direction relative to the upper auger shaft, and causes the at least one radial member of the lower auger to move the mixture in a second axial direction opposite from the first axial direction.

5. The mixer of claim 1 wherein each of the paddles have a paddle edge that extends in a direction parallel to the rotor axis and has a length that overlaps with the edge of paddle edges of adjacent arm assemblies.

6. A mixer comprising:
  a housing having defined therein a first chamber and a second chamber partially in communication with each other;
  two augers in the first chamber, the augers being generally parallel to each other;
  a rotor shaft in the second chamber mounted for rotation about an axis that is generally parallel to the two augers; and
  a plurality of paddle assemblies mounted in spaced relation to one another along the rotor shaft, each of the paddle assemblies including at least three arms and three paddles, each of the paddles being staggered with respect to each of the paddles on adjacent paddle assemblies, each of the paddles fixed to one and only one of the arms, and each of the paddles being free from surfaces that would impart significant axial movement to a mixture in the second chamber as the rotor shaft is rotated.

7. The mixer of claim 6, wherein each of the paddles have a paddle edge that extends in a direction parallel to the rotor and has a length that overlaps with the edge of paddle edges of adjacent paddle assemblies.

8. The mixer of claim 6, wherein the two augers comprise an upper auger and a lower auger and wherein rotation of the upper auger causes the mixture to move in a first direction and rotation of the lower auger causes the mixture to move in a second direction that is generally opposite to the first direction.

* * * * *